(12) United States Patent
Zhang et al.

(10) Patent No.: US 11,802,699 B2
(45) Date of Patent: Oct. 31, 2023

(54) DESKTOP AIR PURIFIER WITH DOUBLE-LAYER GLASS TUBE ULTRAVIOLET (UV) DISINFECTION LAMP

(71) Applicants: Yan Zhang, Cohasset, MA (US); Tianlan Zhang, Weymouth, MA (US)

(72) Inventors: Yan Zhang, Cohasset, MA (US); Tianlan Zhang, Weymouth, MA (US)

( * ) Notice: Subject to any disclaimer, the term of this patent is extended or adjusted under 35 U.S.C. 154(b) by 287 days.

(21) Appl. No.: 17/203,537

(22) Filed: Mar. 16, 2021

(65) Prior Publication Data

US 2022/0299222 A1 Sep. 22, 2022

(51) Int. Cl.
| | |
|---|---|
| F24F 8/22 | (2021.01) |
| F24F 8/50 | (2021.01) |
| F24F 8/80 | (2021.01) |
| F24F 8/108 | (2021.01) |
| F24F 13/20 | (2006.01) |
| C02F 1/32 | (2023.01) |
| F24F 13/28 | (2006.01) |

(52) U.S. Cl.
CPC .............. *F24F 8/22* (2021.01); *C02F 1/325* (2013.01); *F24F 8/108* (2021.01); *F24F 8/50* (2021.01); *F24F 8/80* (2021.01); *F24F 13/20* (2013.01); *F24F 13/28* (2013.01); *F24F 2013/207* (2013.01)

(58) Field of Classification Search
CPC ........ F24F 8/22; F24F 8/50; F24F 8/80; F24F 8/108; F24F 13/20; F24F 13/28; F24F 2013/207; C02F 1/325
USPC .......................................................... 422/24
See application file for complete search history.

(56) References Cited

U.S. PATENT DOCUMENTS

| | | | | |
|---|---|---|---|---|
| 2017/0122607 A1* | 5/2017 | Son | ......................... | F24F 13/20 |
| 2019/0032932 A1* | 1/2019 | Xing | .................. | B01D 46/4263 |
| 2022/0023789 A1* | 1/2022 | Oh | ......................... | F24F 13/065 |
| 2022/0154953 A1* | 5/2022 | Herskovitz | ............... | F24F 8/22 |
| 2022/0186950 A1* | 6/2022 | Park | ......................... | F24F 8/80 |
| 2022/0339573 A1* | 10/2022 | Seo | ........................ | B01D 46/12 |
| 2022/0373203 A1* | 11/2022 | Zhou | ........................ | F24F 8/80 |

FOREIGN PATENT DOCUMENTS

| | | | | |
|---|---|---|---|---|
| CN | 112856699 A | * | 5/2021 | |
| CN | 113332481 A | * | 9/2021 | |

* cited by examiner

*Primary Examiner* — Justin M Jonaitis
(74) *Attorney, Agent, or Firm* — KRIEGSMAN & KRIEGSMAN

(57) ABSTRACT

The Desktop Air Purifier with Double-layer Glass Tube Ultraviolet Disinfection Lamp (The desktop air purifier with DLGTUVDL) uses a turbo blower with an air filter to draw in outside air to be disinfected through its specially designed double-layer glass tube ultraviolet disinfection lamp.

The ultraviolet disinfection lamp of the desktop air purifier has a double-layer glass tube with an inner glass tube and an outer glass tube. The center of the inner glass tube is a hollow space for external air to pass through and receive UV disinfection. This unique design allows ultraviolet rays to surround the entire hollow tube space to provide 360-degree ultraviolet radiation and disinfection at a close distance without dead ends, which greatly improves the disinfection efficiency.

In addition, the desktop air purifier with DLGTUVDL has the function of natural plant scent air purifying agent to provide the disinfected air that carries the natural plant scents.

1 Claim, 4 Drawing Sheets

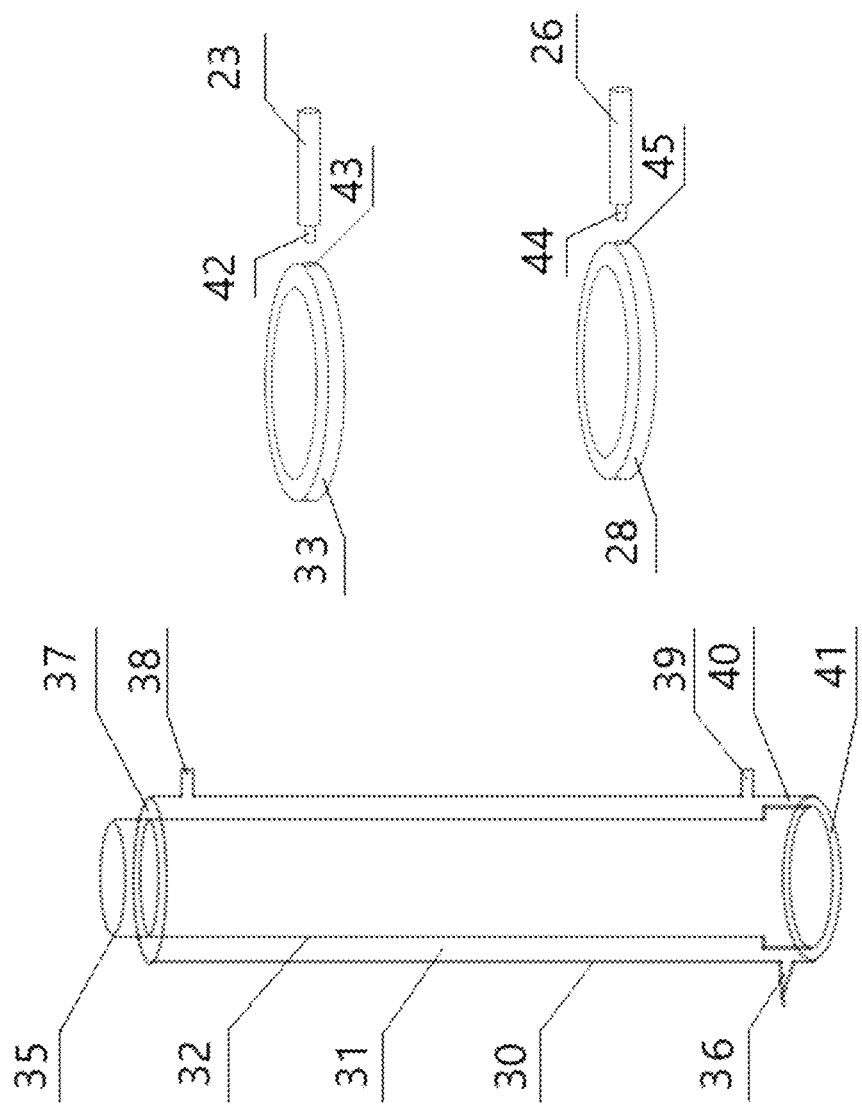
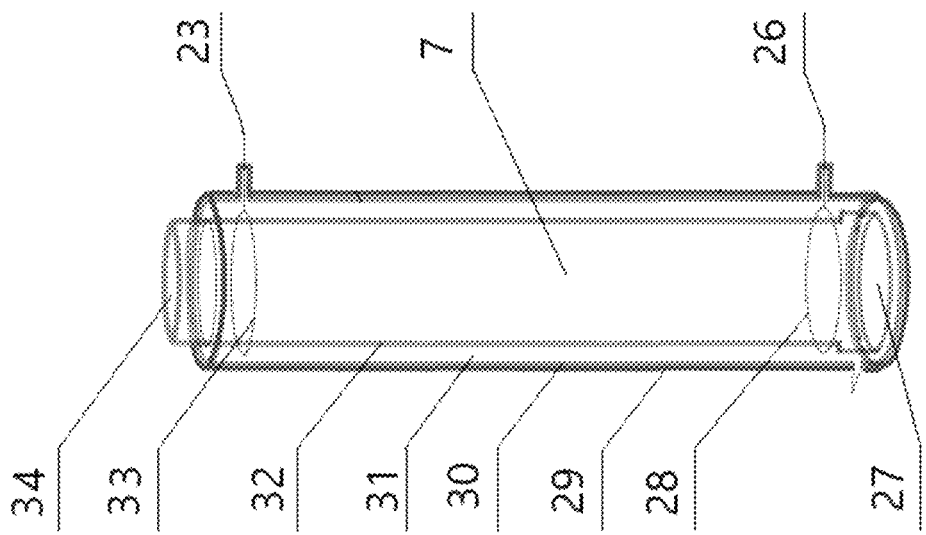
FIG.4
FIG.3
FIG.2

DESKTOP AIR PURIFIER WITH DOUBLE-LAYER GLASS TUBE ULTRAVIOLET (UV) DISINFECTION LAMP

BACKGROUND OF THE INVENTION

1. Technical Field

The ultraviolet disinfection lamp (UV Lamp) currently on the market provides the UV wavelength range between 100-254 nm. These lamps provide physical sterilization and disinfection performance by destroying the DNA gene structure of bacteria, viruses, and microorganisms to destroying their ability to reproduce. Thus, these UV lamps are effective to eliminate various of viruses includes the new coronavirus (Covid-19). These UV lamps are often used in air disinfection but there are two major disadvantages. First, the existing ultraviolet disinfection lamp has an issue of ultraviolet radiation intensity decreasing with increasing distance. There is no disinfection function beyond a certain distance. Second, in order to have an adequate disinfection effect, it requires maintaining a certain time for ultraviolet rays and air to be in contact over a period of time. Thus, the common air purifier with build in UV functions uses strong and high-power ultraviolet lamps and uses many ultraviolet lamps to achieve the disinfection effect. Such application causes high energy consumption, and the use of a large size air purifier due to the space requirement needed to accommodate the use of many lamps which also leads to increased manufacturing costs.

The unique feature of the invention: Desktop Air Purifier with Double-layer Glass Tube Ultraviolet (UV) Disinfection Lamp is that the lamp tube of the ultraviolet disinfection lamp is designed as a double-layer glass tube with an inner layer tube and an outer layer tube. The center of the inner layer glass tube is a hollow space for external air to pass through and receive UV disinfection. Electrodes are arranged in the vacuum layer which is formed between the double-layer glass tube to generate ultraviolet rays. The unique design of the present invention allows ultraviolet rays to surround the entire central hollow tube space. The airflow through the hollow tube space can get 360-degree ultraviolet radiation and disinfection at a very close distance without dead ends, which greatly improves the disinfection efficiency. In addition, the outside of the lamp tube of the ultraviolet disinfection lamp is coated with a mercury coating film, so that the ultraviolet light is concentrated into the hollow tube space of the double-layer glass tube ultraviolet disinfection lamp. While the outside air is brought into the hollow tube space of the double-layer glass tube ultraviolet disinfection lamp, the ultraviolet rays sterilize the air passing through the lamp tube in a closed state, and the probability of ultraviolet rays leaking to the outside world is zero. This lamp tube design greatly improves the disinfection efficiency of the purifier and save energy. Ultimately, it also reduces the manufacturing cost of the purifier. This purifier is a desktop type and very small in size. The user can put it on a desk for personal protection.

In an office setting for example, each person can place one at their personal desk. Thus, several Air Purifiers with Double-layer Glass Tube Ultraviolet (UV) Disinfection Lamp are used simultaneously, which is more efficient comparing to using only one large air purifier. When working in an office, or when dining in a restaurant, placing the Desktop Air Purifier with Double-layer Glass Tube Ultraviolet (UV) Disinfection Lamp on the table to have it work to disinfect air covering surrounding area can allow people to be safe without wearing masks.

2. Background

With the outbreak of the new coronavirus in 2020, more than ever, we need an efficient air disinfection purifier to deal with the infections and viruses around us. The currently prevalent new coronavirus exists in the air, on clothes, and at various contact points such as building door handles.

Ultraviolet (UV) is a powerful tool to kill all kinds of viruses. The current UV disinfection lamps on the market have the following shortcomings: the UV radiation is uneven, the UV is strong when the distance is close, and becomes weak when the distance is far, and there is no disinfection effect beyond a certain distance. The intensity of ultraviolet rays is also affected by ambient temperature. The known ultraviolet sterilization lamp is mainly used in the sterilization and disinfection application of the central air-conditioning system that improves the air quality of the room. The disadvantage is that in a large space with uneven air flow, especially in many dead corners of the room space, it is impossible to fully sterilize and disinfect all the air.

The present invention will effectively overcome the above shortcomings. The invention will not only provide air disinfection but also it can be used to disinfect objects. This air disinfection purifier has 2 lamp options, one is a lamp without ozone (the emission spectrum is about 254 nm), which is generally used for air disinfection, and the other is a lamp with ozone (the emission spectrum is about 185 nm), which is commonly used for disinfection of clothes, hands, and tables etc.

In addition, the Air Purifier with Double-layer Glass Tube Ultraviolet (UV) Disinfection Lamp is specially designed to add the function of natural plant scents, so that the disinfected air will carry the natural plant scents. The scent with the disinfected air is blown out by the air purifier to provide a refreshing and pleasurable experience for the user. This experience can stimulate one's resistance to viruses. Some plant scents are also virus-inhibiting.

BRIEF SUMMARY OF THE INVENTION

The invention consists of the following parts: air filter, turbo blower, natural plant scents disinfectant emission unit, double-layer glass tube ultraviolet disinfection lamp, shock-absorbing foam, and plastic shell cover. The core component of the desktop air purifier with double glass tube ultraviolet disinfection lamp is the built-in double glass tube ultraviolet disinfection lamp, which is made of pure quartz glass and has a high ultraviolet transmittance. Through the double-layer glass tube ultraviolet disinfection lamp (DLGTUVDL), the air purifier gathers the external air into the center hollow tube of the DLGTUVDL surrounded by the ultraviolet rays to irradiate and disinfect the passing airflow at an extremely close distance, thereby improving the disinfection efficiency. Two sets of electrodes are evenly arranged in the vacuum layer of the double-layer glass tube ultraviolet disinfection lamp. Under the principle of the mercury lamp, the bipolar arc discharge will evaporate mercury, thereby generating the spectral line of mercury vapor that is ultraviolet rays.

The desktop air purifier with DLGTUVDL has two kinds of lamps to choose from, one is a lamp without ozone (the emission spectrum is about 254 nm), which is generally used for air disinfection, the other is a lamp with ozone (the emission spectrum is about 185 nm) that is generally used for disinfection of clothes, hands, tables, and other substances.

The ultraviolet disinfection lamp is specially designed with the function of a natural plant scent disinfectant emission unit that provides natural plant scents. Adding the natural plant purification liquid allows the disinfected air to carry natural plant scents. The scents together with the disinfected air are blown out from the air purifier to provide refreshing and high-quality air to users as it helps to improve the user's resistance to viruses.

To protect the built-in DLGTUVDL from breaking due to handling and outside forces, shock-absorbing foam is designed around the lamp to protect the lamp. The invention is used for personal air disinfection and virus protection: to prevent bacterial and virus infections in the outdoor and indoor air, especially to provide protection and prevention in any closed environment: such as homes, offices, hospitals, restaurants, schools, etc.

Compared with the existing indoor purifiers on the market, this invention can provide individuals with disinfection protection in a certain surrounding radius area and in a close range economically and concisely.

BRIEF DESCRIPTION OF THE SEVERAL VIEWS OF THE DRAWINGS

These and other aspects of the invention will now be further described, by way of example only, with reference to the accompanying figures:

FIG. 2 shows the structure diagram of the double-layer glass tube ultraviolet disinfection lamp FIG. 3 shows a representation of a schematic diagram of the lamp tube embodiment of the double-layer glass tube ultraviolet disinfection lamp FIG. 4 shows a schematic diagram of electrode embodiment of double-layer glass tube ultraviolet disinfection lamp

DETAILED DESCRIPTION OF A PREFERRED EMBODIMENT

Figure 1:
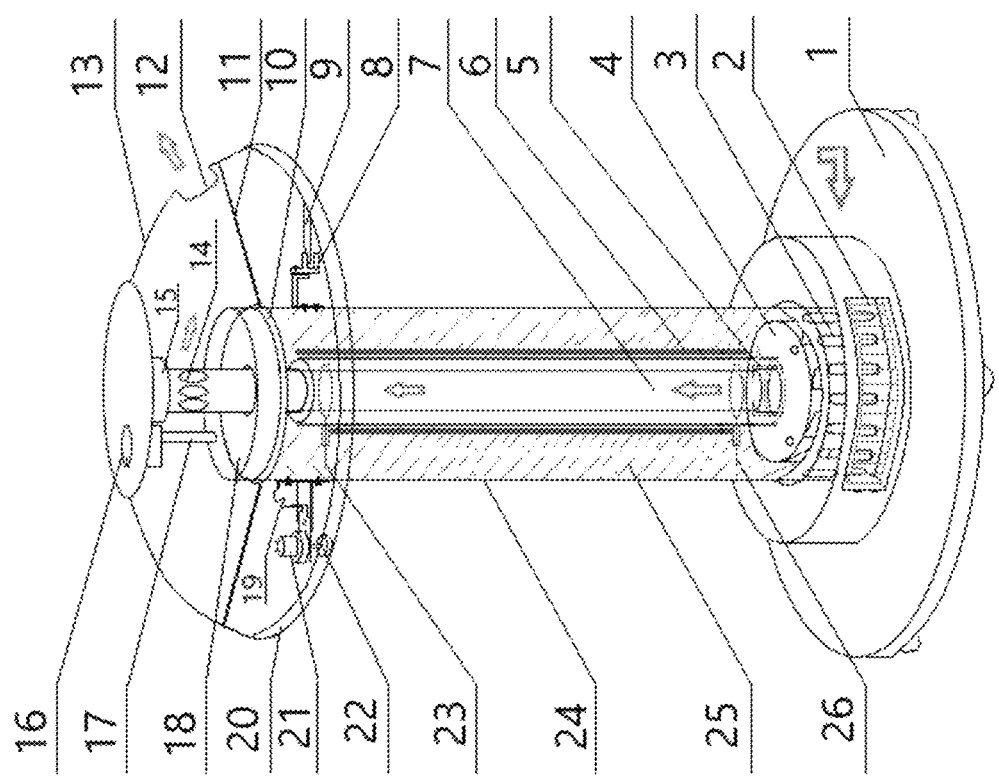
FIG. 1 shows a view of the structure diagram of a desktop air purifier with double glass tube ultraviolet disinfection lamp

These drawings describe the function and operation of the apparatus:

FIG. 1 shows a view of the structure diagram of a desktop air purifier with double glass tube ultraviolet disinfection lamp.

The desktop air purifier with double-layer glass tube ultraviolet disinfection lamp (The desktop air purifier with DLGTUVDL) consists of three parts: oscillating head, body, and base.

The blue arrow indicates outside air. First, the turbo blower (4) generates suction to lead the outside air to be filtered through the air filter cotton (2) to filter the dust and other impurities in the air, then the air enters the air inlet (3) and continues traveling into the double-layer glass tube ultraviolet disinfection lamp (6) via the connecting sleeve (5) to be disinfected in the hollow tube (7). Finally, the disinfected air is blown out from the air outlet (12) through the air outlet of the hollow tube (14). The natural plant scent air purifying agent is added through the air purifying agent adding port (16), and the purifying agent is dripped into the air purifying agent dispersion unit (18) along the air purifying agent dropper (17). Whenever the disinfected air is blown out from the air outlet of the hollow tube (14), the refreshing scent of the air purifying agent is also blown out together with the air.

The air outlet of the hollow tube (14) has eight air outlets evenly arranged within the 360 range. The air coming out of the air outlet of the hollow tube is multi-directional, but the air outlet (12) is only at one direction of the air purifier. Part of the airflow is mixed with the emitted purifying agent to be blown out from the air outlet (12).

The oscillating head (13) is divided into two spaces by the partition plate (11) and the plastic movable sealing ring (10). In the upper space, there is an air outlet of the hollow tube (14), an air outlet (12), an air purifying agent adding port (16), an air purifying agent dropper (17) and an air purifying agent dispersing unit (18). The purified air is blown out from the air outlet (12) in the upper space and will not flow into the lower space. In the lower space, there is a DC deceleration motor (21), a tension spring (19), a rubber wheel (22), an oscillating head friction edge (20), a position photoelectric sensor (8), location iron sheet (9) and a rotating bearing (15).

Under the action of the tension spring (19), the DC deceleration motor (21) makes the rubber wheel (22) press the oscillating head friction side (20), and the rotating bearing (15) drives the oscillating head (13) to rotate between left and right.

There are three position photoelectric sensors (8)—only one is shown here on FIG. 1 and three location iron sheets (9)—only one is shown here on FIG. 1. After the position photoelectric sensor senses the location iron sheet, the reverse rotation control circuit controls the DC deceleration motor (21) to drive the oscillating head (13) to rotate forward direction, rotate reverse direction or stop.

Each of the position photoelectric sensors (8) has different function. One position photoelectric sensor is used to make the DC deceleration motor (21) to rotate forward direction, one position photoelectric sensor is used to make the DC deceleration motor (21) to rotate reverse direction, and one position photoelectric sensor is used to stop the DC deceleration motor (21). Once the air purifier is stopped, the position photoelectric sensor will return the air outlet (12) to its position (stopped at the middle of the air purifier body)

The body of the desktop air purifier with DLGTUVDL consists of a cylindrical shaped shell (24), double-layer glass tube ultraviolet disinfection lamp (6), and shock-proof foam (25). In order to protect the built-in DLGTUVDL from being broken by an external force accidently, shock-proof foam (25) is designed to cover the entire outside of the lamp tube to protect the lamp tube. The anode power supply connecting rod (23) and the cathode power supply connecting rod (26) are connected to a mercury lamp transformer.

The base (1) supports and fixes the cylindrical shaped shell (24) and the oscillating head (13). There are also an air inlet (3) and an air filter cotton (2).

FIG. 2 shows the structure diagram of the double-layer glass tube ultraviolet disinfection lamp. The core part of the desktop air purifier: DLGTUVDL consists of an inner glass tube (32) and an outer glass tube (30). A vacuum layer (31) is formed between the inner glass tube (32) and the outer glass tube (30). The anode ring (33) and the cathode ring (28) are respectively arranged at the upper and lower ends of the vacuum layer of the lamp. Then a certain amount of high purity mercury is added into the vacuum layer.

The anode power supply connecting rod (23) and the cathode power supply connecting rod (26) are connected to a mercury lamp transformer to generate high voltage discharges by the anode and the cathode. Under the principle of the mercury lamp, the bipolar arc discharge will evaporate the mercury, thereby producing the spectral line of mercury vapor. The resulting ultraviolet rays are irradiated in the hollow tube (7) at 360 degrees without dead angles to disinfect the air passing through the hollow tube (7). The outer glass tube (30) is coated with mercury film coating (29), the ultraviolet rays generated by the disinfection lamp and irradiated in from all directions are concentrated and reflected into the hollow tube of the double-layer glass tube ultraviolet disinfection lamp. The probability of ultraviolet leakage to the outside is zero.

The external air enters the hollow tube (7) through the air inlet port (27) and receives a very close distance, barrier-free, sealed, and 360-degree circular ultraviolet radiation to greatly improve disinfection efficiency. Finally, the sterilized air is blown out from the air outlet port (34).

FIG. 3 shows a representation of a schematic diagram of the lamp tube embodiment of the double-layer glass tube ultraviolet disinfection lamp.

The core component of the desktop air purifier with DLGTUVDL is the double glass tube ultraviolet disinfection lamp. The inner layer tube of the lamp is made of pure quartz glass with high light transmittance. The outer layer of the lamp is made of regular glass. The lamp tubes are made by blowing molding using a high temperature technique. The outer glass tube (30) is sleeved outside the inner glass tube (32). A vacuum layer (31) is formed in between. The upper glass cover (37) and the lower glass cover (41) seal the vacuum layer (31). The connecting port-female (40) and connecting port-male (35) are premade on every lamp and can be used to connect multiple UV disinfection lamps. The connecting port-female (40) of the second ultraviolet disinfection lamp can be connected to the connecting port-male (35) on the first ultraviolet disinfection lamp to allow multiple lamps to be connected in series. The anode seal (38) is used to fix the anode. The cathode seal (39) is used to fix the cathode. After putting in the electrodes, the inside air of the vacuum layer of the disinfection lamp is vacuumed via vacuum outlet (36) and then sealed.

FIG. 4 shows a schematic diagram of electrode embodiment of double-layer glass tube ultraviolet disinfection lamp.

The electrode material is made of tungsten steel. The anode consists of two parts: anode ring (33), and anode power supply connecting rod (23).

One end of the anode power supply connecting rod (23) is an anode connecting rod screw (42) screwed into the anode nut (43) to be connected to the anode ring (33). This facilitates the assembly of the electrode in the vacuum layer of the disinfection lamp.

The cathode is composed by two parts: the cathode ring (28) and the cathode power supply connecting rod (26).

One end of the cathode power supply connecting rod (26) is the cathode connecting rod screw (44) screwed into the cathode nut (45) to be connected to the cathode ring (28).

This facilitates the assembly of the electrode in the vacuum layer of the disinfection lamp.

Figure 5:
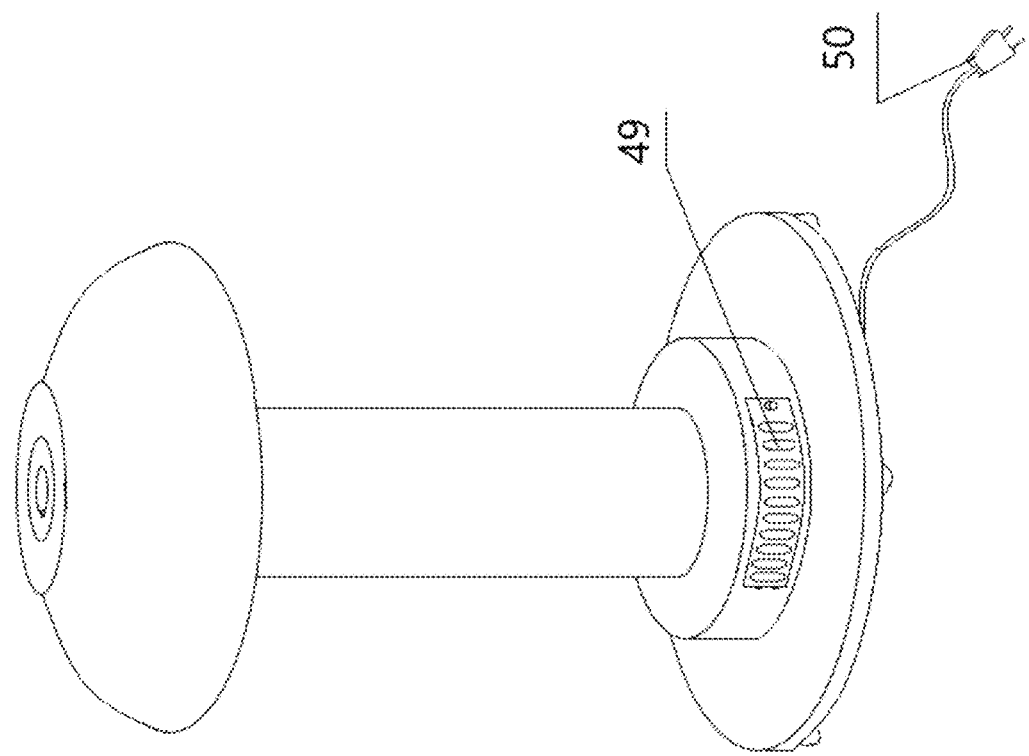
FIG. 5 shows a front view of a desktop air purifier with double-layer glass tube ultraviolet disinfection lamp

FIG. 5 shows a front view of a desktop air purifier with double-layer glass tube ultraviolet disinfection lamp.

The desktop air purifier with double glass tube ultraviolet disinfection lamp consists of a base (1), a cylindrical shaped shell (24), and a mushroom-shaped oscillating head (13). To add the natural plant air purifier agent via the air purifying agent adding port (16) on the top of the mushroom-shaped oscillating head (13).

Rotating the potentiometer switch (46) to the right turns on the air purifier, then the light-emitting indicator (48) turns on, the desktop air purifier with DLGTUVDL starts working, and the turbo fan starts working. Continue to rotate the potentiometer switch (46) to the right to increase the wind force, until reaching the maximum wind force. The light-emitting indicator (48) displays the level of the wind power in the form of a row of lights. Turn the potentiometer switch (46) to the left to reduce the wind force until it turns off. The oscillating head (13) is controlled by the oscillating head control switch (47). When the oscillating head control switch (47) is turned on, the oscillating head (13) can swing around 180 degrees. Therefore, the air outlet (12) of the mushroom-shaped oscillating head (13) emits air evenly within the range of 180-degree radius. Turn off the oscillating head control switch (47), and the air outlet (12) returns to the center of the fuselage.

Figure 6:
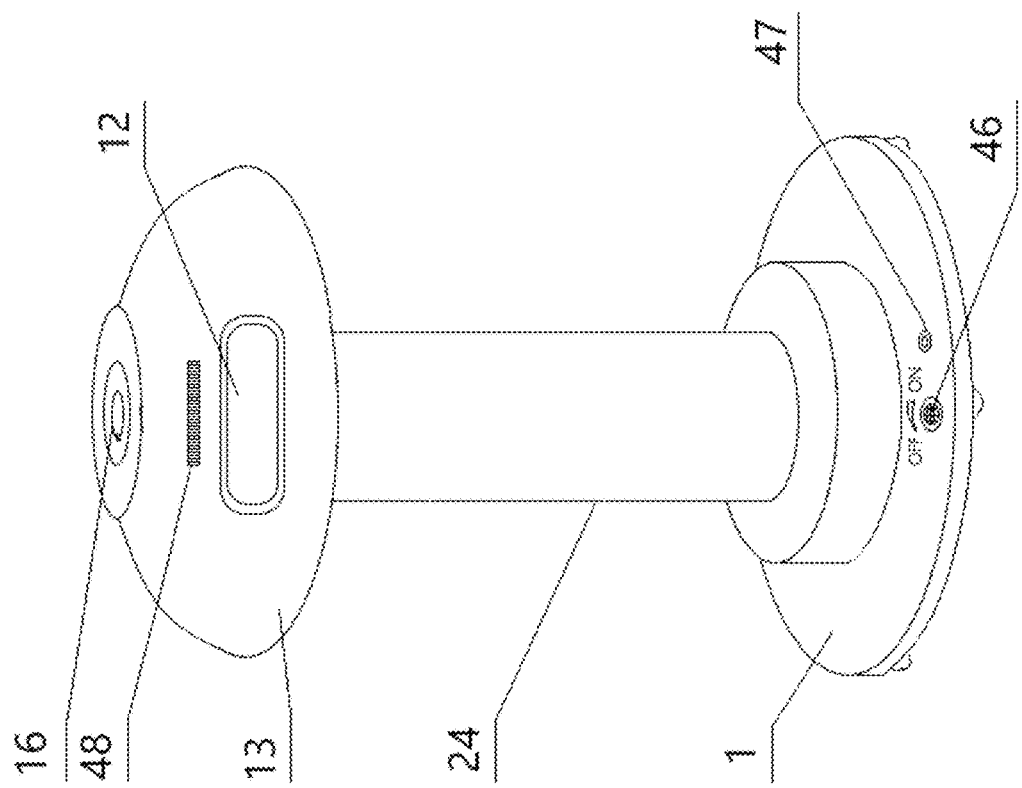
FIG. 6 shows the back view of a desktop air purifier with double glass tube ultraviolet disinfection lamp

FIG. 6 shows the back view of a desktop air purifier with double glass tube ultraviolet disinfection lamp.

This figure shows the power plug (50) and the cotton filter compartment door (49).

Plug in the power plug (50) and the purifier's power on. Open the cotton filter compartment door (49) to replace the filter.

Figure 7:
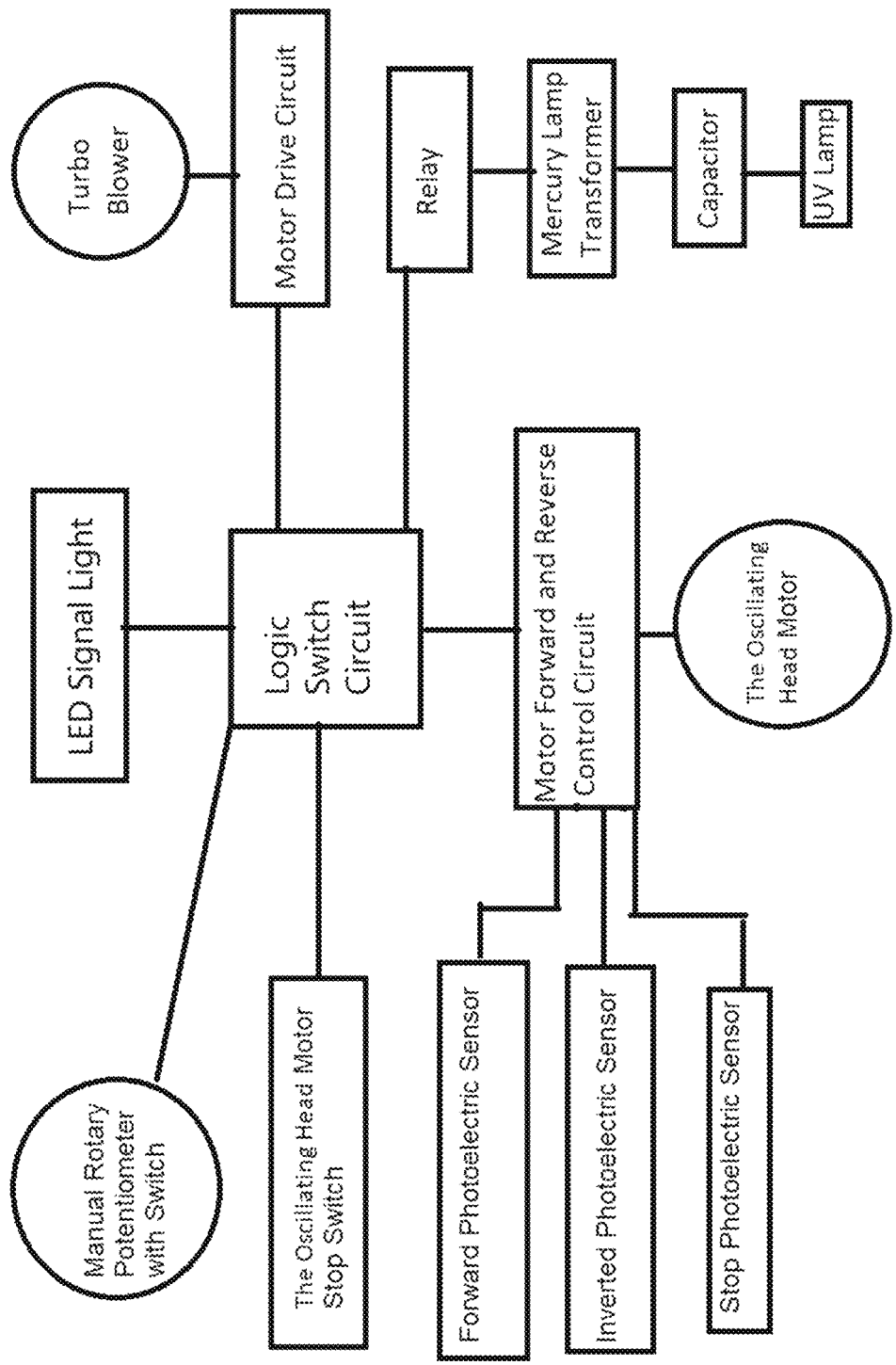
FIG. 7 shows, in block diagram form, the Circuit diagram of a desktop air purifier with double glass tube ultraviolet disinfection lamp.

FIG. 7 shows, in block diagram form, the Circuit diagram of a desktop air purifier with double glass tube ultraviolet disinfection lamp.

The design idea of this circuit diagram is to demonstrate an easy to operate and economic (saving costs) concept.

Thus, the control of the purifier uses low-cost small-scale integrated circuits. Its panel operation adopts manual knob positioner switch and button switch.

Through the logic switch circuit, the LED indicator light is gradually displayed in the form of a row of lights corresponding to the level of the wind power. The logic switch circuit controls the strength of the turbo blower through the motor drive circuit. The logic switch circuit turns on the relay, which causes the mercury lamp transformer to generate high voltage and limits the current through the capacitor to cause the double-layer glass tube ultraviolet disinfection lamp to work.

The logic switch circuit uses the motor's forward and reverses rotation control circuit and cooperates with three position photoelectric sensors to make the oscillating head motor move forward, reverse, and stop.

DETAILED DESCRIPTION OF THE INVENTION

The invention: The core component of a desktop air purifier with double-layer glass tube ultraviolet disinfection lamp is its built-in double-layer glass tube ultraviolet disinfection lamp. The disinfection lamp is made of pure quartz glass with high light transmittance. It is made by blow-molding using a high temperature technique and consists of two parts: outer glass tube and inner glass tube. The inner glass tube is sleeved inside of the outer glass tube. A vacuum layer is formed between the two glass tubes. The inner glass tube is a hollow tube which allows the external air to get sterilization when passing through the hollow tube area. There are two pairs of electrodes evenly arranged in the vacuum layer of the lamp. Under the action of the mercury lamp transformer, the electrode discharges. Under the principle of the mercury lamp, the bipolar arc discharge will evaporate mercury, thereby generating the spectral line of mercury vapor, that is, ultraviolet rays.

The biggest feature of the present invention is that the air is transported in a concentrated state to the hollow tube space of the inner glass tube, and the outer glass tube is coated with a mercury film to allow ultraviolet rays to be reflected back to the hollow tube space of the inner glass tube without Ultraviolet ray leakage and waste of Ultraviolet rays. It maximizes the concentration of all ultraviolet rays in the hollow tube space of the inner glass. In other words, in this case, the distance between the air and the ultraviolet rays is close to zero. There is only one layer of inner glass between them. This design solves the problem of UV attenuation due to distance increases.

The ultraviolet lamp of the present invention is also designed with readymade male and female ports on the lamp tube, which can make a plurality of lamp tubes used in series to enhance the ultraviolet radiation. The special design is to have external air continuously enter the center hollow tube of double-layer glass tube to receive direct and continuous disinfection without other additional accessories. Compared with the current disinfection evolver on the market, this invention's production cost is greatly reduced.

In a closed indoor environment, the air is turbid. After the ultraviolet lamp tube disinfects and purifies the air, the ultraviolet lamp air disinfector is designed to emit a natural plant scent at the last session of the disinfected air path. It contains natural plant purifiers collected from the forest. The natural plant purifying agent is blown out from the air outlet along with the disinfected air which is refreshing and pleasurable to the user as well as improving the users own resistance to the viruses.

The invention is used for personal air disinfection and virus protection: to prevent bacterial and virus infections in the outdoor and indoor air, especially to provide protection and prevention in any closed environment: such as homes, offices, hospitals, restaurants, schools, etc.

Compared with the existing indoor purifiers on the market, this invention can provide individuals with disinfection protection in a specific area and in a close range economically and concisely.

The purifier's oscillating head function: the air outlet on the top of the mushroom head shape of the present invention is designed to continuously blow air from 0°—180° range that increases the scope of disinfection width. The disinfected air blows on the user's body and face to bring benefits to the user quickly and directly.

Under the action of the tension spring, the DC deceleration motor makes the rubber wheel press the oscillating head friction edge, and the rotating bearing drives the oscillating head to rotate between left and right.

There are three position photoelectric sensors and three location iron sheets. After the position photoelectric sensor senses the location iron sheet, the reverse rotation control circuit controls the DC deceleration motor to rotate forward direction, rotate reverse direction or stop.

Those three position photoelectric sensors have their own separate functions. One position photoelectric sensor is used to make the DC deceleration motor rotate forward, one position photoelectric sensor is used to make the DC deceleration motor reverse, and one position photoelectric sensors is used to stop the DC deceleration motor. Once the desktop air purifier with DLGTUVDL is stopped, the position photoelectric sensor will make the air outlet return to its position (stop at the middle of the purifier body)

The appearance of the desktop air purifier with DLGTUVDL is designed as a mushroom to achieve natural looking, simple structure, convenient to use, and low cost.

The invention is very easy to operate. The invention uses a knob with a potentiometer switch to complete functions such as turning on, turning off, and adjusting the wind power. The design of the oscillating head control switch is for the user to choose whether to use the oscillating function or not. If the user chooses the option of not to oscillate, the air outlet will automatically remain in the center position of the purifier. The purifier has a light indicator to display the level of the wind power intuitively.

The optimized design of this product in the following area to reduce the cost to improve popularization, which contributes to promote national epidemic prevention:

1. Concise exterior design and use plastic as the main material.
2. Utilize the hollow tube of the double-layer glass tube itself for direct disinfection without additional accessories.
3. The control circuit uses low-cost digital circuit integrated blocks.
4. Intuitive and simple operation interface Operation manual of the Desktop Air Purifier with DLGTUVDL: Turn the knob to the right to turn on the purifier, continue to turn the knob to the right to increase the wind power, until at the end maximum wind power is achieved. Meantime, the light-emitting indicator 1 indicates the level of the wind power. Turn the knob to the left to reduce the level of the wind until it reaches the end, when the purifier is turned off. The head-oscillating selection switch can choose two options: head oscillating or no head oscillating when air is blown out via the air outlet. If the user chooses the option with head oscillating, the mushroom-shape oscillating head together with the air outlet on the top of the mushroom-shape oscillating head will turn back and forth with in the 180-degree range. When stopped, the air outlet on the top of the mushroom-shape oscillating head will automatically return to the center position.

If the user chooses the option of no head oscillating, the air outlet on the top of the mushroom-shape oscillating head will not turn back and forth but stay in the center position.

The filter cotton shall be replaced with new filter cotton regularly according to the instructions. To add the natural plant scent air purifying agent: The natural plant scent air purifying agent is added through the air purifying agent adding port on the top of the mushroom-shaped oscillating head.

The invention claimed is:

1. An air purifying apparatus comprising:
  a mushroom-shaped body comprising an inlet located at a cylindrical base portion of the mushroom-shaped body, an outlet located on an oscillating head portion of the mushroom-shaped body, a cylindrical double-layer glass tube located within the cylindrical base portion;
  wherein the oscillating head portion has a rounded dome shape and the base portion has a smaller diameter than the oscillating head portion;
  wherein the double-layer glass tube comprises an inner glass tube made of high-resolution quartz glass, and an outer glass tube, wherein a vacuum layer is formed between the inner and outer glass tubes, said inner glass tube being a hollow tube allowing a flow of air to pass through said inner glass tube;
  a plurality of electrodes placed within the vacuum layer to generate high-intensity ultraviolet rays within the vacuum layer and to disinfect the flow of air passing through the inner glass tube in 360 degrees of direction;

an air filter compartment with a cotton air filter located upstream of the inlet of the mushroom-shaped body;

a fan to draw the flow of air from an ambient environment in through the inlet, through the inner glass tube for interaction with the ultra violet light, and out through the outlet of the mushroom-shaped body as disinfected air;

an air purifying agent adding port located on the oscillating head portion, a purifying agent dropper, and an air purifying agent dispersion unit to allow the flow of air to carry a liquid air purifying agent;

wherein the oscillating head portion rotates within a range of 180 degrees to provide disinfected air to the ambient environment.

* * * * *